United States Patent Office 2,746,856
Patented May 22, 1956

2,746,856

PROCESSES FOR TREATING MATERIALS CONTAINING NICKEL AND IRON

Edgar B. Mancke, Bethlehem, Pa., assignor to Bethlehem Steel Company, a corporation of Pennsylvania No Drawing. Application February 28, 1952,
Serial No. 274,055

6 Claims. (Cl. 75—1)

My invention is directed primarily to processes for separating nickel and iron in materials which contain these two elements. My invention is also directed to the treatment of materials containing nickel and iron and which contain other elements such as chromium and cobalt for the purpose of separating these other elements as well as nickel from the iron.

Nickel is associated with iron in many materials. Many ores, for example, contain both of these elements. An object of my invention is to recover nickel from these materials.

An especially important object of my invention is the removal of nickel, or nickel and other non-ferrous metals such as cobalt and chromium, from iron ores to produce an iron product which can be used commercially in the manufacture of iron and steel. While nickel is a valuable constituent of many special steels it is not desirable in any considerable amounts in most of the commercial steels. In large tonnages of steel, in fact, it is usually desired to have the nickel content sufficiently low so that the nickel will have no substantial effects upon the properties of the steel. It is very important to keep the nickel content of the ore as low as practicable when such ore is to be used in making "hot metal" or "pig iron" for the manufacture of steel, in view of the fact that much of the scrap which is used in making steel already contains some nickel. Unless care is taken to use ore which is low in nickel content when making the hot metal or pig iron the nickel content of the hot metal or pig iron together with the nickel of the scrap can easily cause the nickel content of the finished steel to be above permissible tolerances.

It is a special object of my invention to remove nickel from iron ores which have hitherto offered great difficulty in treatment to render them available for use in general iron and steel manufacture. An example of such ores are the so-called Mayari ores. In the disclosure of my invention I shall refer to the treatment of Mayari ores for the purpose of setting forth the conditions and principles of the processes which are involved in my invention.

In Cuba there are very large deposits of these Mayari ores. They have high iron contents and therefore should be very valuable as a source of iron in the manufacture of iron and steel. As yet, however, these ores have not been utilized except for certain limited purposes because of the fact that heretofore there has been no effective and economical method devised for the removal of nickel. Other substances beside nickel are present in Mayari ores which should be removed to render the ores fully effective for use in the manufacture of iron and steel, such as chromium, aluminum and cobalt. The primary difficulty, however, is that of removing nickel. These ores contain nickel in such an amount and in such a condition as have heretofore prevented them being commercially beneficiated for use in the general manufacture of iron and steel. This difficulty in lowering nickel to the necessary extent is primarily due to the fact that a substantial part of the nickel is in such a state or is so bound to or combined with the other constituents of the ore as not to be easily removed from the ore to bring the nickel content down to a sufficiently low figure.

Mayari ores as they occur in nature contain considerable "free water" and also a substantial amount of "combined water." Analyses of the calcined ores vary considerably but in general they run within ranges approximately as follows:

|  |  | Percent |
|---|---|---|
| Fe | 54 |  |
| Ni | 1.0 | 0.25 to 1.56. |
| Cr | 2.2 | 2.0 to 2.7. |
| Co | 0.15 | 0.05 to 0.35. |
| Mn | 0.5 | 0.24 to 1.76. |
| SiO$_2$ | 5.0 | 1.6 to 7.0. |
| Al$_2$O$_3$ | 10.0 | 6.0 to 14.0. |

In this table of analyses, the first column indicates the constituents of the ore; the second column indicates an average analysis; and the remainder of the table indicates the ranges. When, in this specification, I refer to Mayari type ores I mean those ores which, like the Mayari ores, have a considerable content of iron and contain nickel in a substantially lesser amount but still in an amount too great for general iron and steel making, and in which ores the nickel is difficult to reduce to the necessarily small amounts required for general iron and steel making.

My invention comprises the steps of mixing the material containing nickel and iron or nickel, cobalt and iron with an aqueous solution of nitric acid, subjecting compounds of such mixture to high temperatures and pressures in an autoclave to produce an aqueous solution of nickel nitrate or nickel and cobalt nitrate and obtaining iron in the solid phase, and separating the solution from the iron.

My invention is based, in part, on my discovery that ferric nitrate is unstable in aqueous solution under certain conditions and forms nitric acid and ferric oxide, which latter is insoluble and is precipitated, whereas nickel nitrate and cobalt nitrate in aqueous solution and under the same conditions are essentially stable and remain in solution. The conditions which produce this difference of stability of ferric and nickel nitrates may be indicated as follows. When an aqueous solution of ferric nitrate and free nitric acid is autoclaved at certain high temperatures the ferric nitrate forms nitric acid, which remains in solution, and ferric oxide which is precipitated. When an aqueous solution of nickel nitrate and free nitric acid is autoclaved at the same temperatures the nickel nitrate is unaffected and remains in solution. The discovery of the fact that there are temperatures at which ferric nitrate in aqueous solution containing free nitric acid is unstable but at which temperatures nickel nitrate under the same conditions is stable has two significant aspects as regards my invention. Where in this disclosure I refer to ferric oxide being formed and precipitated I desire the expression "ferric oxide" to cover not only ferric oxide itself but hydrated ferric oxide or ferric hydroxide as under varying conditions of operation either of these compounds may be formed.

One aspect of this discovery is the fact that when an aqueous solution containing free nitric acid and ferric and nickel nitrates is heated in an autoclave to temperatures where the ferric nitrate is unstable but the nickel nitrate is stable there results the precipitation of ferric oxide but the nickel nitrate remains in solution thereby permitting of the separation of iron and nickel by removing the nickel nitrate solution from the precipitated iron product. Another aspect is the fact that when a material containing nickel and iron is heated in an autoclave with an aqueous solution of nitric acid to those temperatures where ferric nitrate is unstable but where nickel nitrate is stable the nickel of the material forms nickel nitrate and goes into solution while the major part of the iron is undissolved. Of course, there is the theoretical possibility in this case that the iron may first form ferric nitrate but, if so, the ferric nitrate because of its instability under the conditions forms ferric oxide and nitric acid and therefore, in effect at least, it is as if the iron in the material were unaffected by the nitric acid.

My invention comprises two main modes of procedure for separating nickel from iron, these two modes corresponding to the two aspects of my discovery outlined above. In one of these modes of procedure the material containing nickel and iron is subjected to the action of an aqueous solution of nitric acid for a sufficient time to dissolve the major part of both the nickel and iron as nickel and ferric nitrates. If the material being treated contains constituents of other elements which form soluble nitrates, these elements will also form nitrates which go into solution. A quantity of nitric acid solution will be employed sufficient to provide contained nitric acid to nitrate the major part of the iron, nickel, and other nitrate forming constituents. The solution containing the nitrate is separated from the undissolved residue and autoclaved at a temperature at which the ferric nitrate is unstable but at which temperature nickel nitrate is substantially stable. As result of this treatment of the ferric nitrate in solution nitric acid and ferric oxide are formed the latter being precipitated. The nickel nitrate, being stable under the conditions given, is unaffected and remains in solution as nickel nitrate. The solution containing nitric acid and nickel nitrate is then separated from the iron bearing residue. For purposes of convenience I shall hereafter refer to this mode of procedure as the "N–1 process."

In the second main mode of procedure, the material containing nickel and iron is mixed with an aqueous solution of nitric acid, the amount of solution employed being such that the contained nitric acid is at least sufficient to meet the stoichiometric requirements of the nickel and other non-ferrous nitrate forming constituents of the material in their conversion into nitrates but insufficient to meet such requirements and also to nitrate a major portion of the iron in the material. The mixture is then autoclaved at a temperature at which ferric nitrate is unstable but at which nickel nitrate is essentially stable. Under these conditions the nickel is dissolved as nickel nitrate. The major part of the iron, however, remains undissolved in the material being treated. Following the autoclaving operation the solution containing nickel nitrate is separated from the iron bearing residue. For purposes of convenience I shall hereafter refer to this mode of procedure as the "N–2 process."

I shall now give a specific description of an embodiment of the first of the two modes of procedure, namely what I have designated above as the N–1 process. In this specific example, Mayari ore is first dried. It is then ground to −65 mesh. Most of this Mayari ore is finer than −65 but the grinding operation reduces the coarser parts of the ore to a sufficient fineness for further treatment. The ore is then roasted in air at about 800° F. My process is effective without this type of roast but I prefer to employ it as it removes most of the water remaining in the ore and it improves the subsequent extraction of iron from the ore and improves the washing characteristics of the ore during subsequent treatment.

The ore is then mixed with a solution of nitric acid of 25% concentration at 200° F. to dissolve the major part of the iron, nickel and cobalt. The quantity of acid used is such as to be somewhat in excess of the amount which theoretically would dissolve all the iron, nickel, cobalt, manganese and aluminum and part of the chromium in the ore.

The solution thus produced is separated from the undissolved residue and pumped into an autoclave which is heated with saturated steam, 400 p. s. i. gage, which is fed directly into an autoclave to heat the contents to a temperature of 400° F. In this specific example of my process the autoclaving operation is continuous, i. e. the solution is fed continuously into a lower part of the autoclave and discharged continuously from an upper part of the autoclave. The rate of flow of solution into the autoclave and the rate of discharge therefrom are such that the average detention time of material in the autoclave is 68 minutes in this specific example. The contents of the autoclave are continuously agitated during its operation. This treatment in the autoclave effects the precipitation of the major part of the iron in the solution and also about half of the chromium of the solution as oxides. The solution contains most of the nickel as well as other non-ferrous materials as well as some free nitric acid. The solution and precipitated product are separated, and the precipitated product thoroughly washed. The solution, after its separation from the autoclave, is evaporated somewhat and about three-fourths of it mixed with free nitric acid solution and used for the treatment of more ore, and about one-fourth of the solution is pumped to the acid by-product recovery plant wher the nickel and other valuable constituents may be recovered in any suitable manner.

The precipitated iron bearing product is very low in nickel, the amount present being about 0.01%. A sample of the material after being calcined, will analyze substantially as follows:

| | Percent |
|---|---|
| Fe | 67.8 |
| Ni | 0.01 |
| Cr | 1.0 |
| Co | 0.01 |
| Mn | less than 0.10 |
| $SiO_2$ | less than 0.20 |
| $Al_2O_3$ | less than 0.20 |

In the last mentioned example of my invention, the conditions are set forth specifically. The various conditions may vary over considerable ranges and yet come within the scope of my invention. In dissolving the major part of the iron, nickel, manganese, aluminum and cobalt and part of the chromium in the ore prior to autoclaving, the concentration of nitric acid is not critical. The concentrations may vary from 10% to 70% although I prefer a concentration of not over 60%. The amount of acid used may vary considerably but I prefer to use somewhat in excess of the amount of acid which theoretically would be required to combine with all the iron, nickel, cobalt, manganese and aluminum in the ore. The temperature of the acid when being used to dissolve the iron, nickel and cobalt is not critical. Preferably it is at least 100° F. and may be as high as the boiling point.

The temperature of autoclaving may vary from 310° F. to 650° F. For the most rapid precipitation of iron it is desirable to employ temperatures from 385° F. and up. Moreover, the higher temperatures increase the yield of iron, other conditions being the same. The time for autoclaving may vary considerably although the longer periods of time tend to give a more complete precipitation of iron.

As just stated above, in this specific example, the autoclaving treatment is "continuous." While I prefer the continuous method for manipulative and economic reasons my process is fully effective chemically when a batch method is employed. By the "batch" method I mean that method of procedure whereby the autoclave is charged with a material to be treated, autoclaved and then discharged, following which another batch may be charged and treated, and so on. In general I find that the batch method requires a somewhat lesser time of stay in the autoclave than the average detention time required in the continuous method to give the same results.

I shall now give a specific description of an embodiment of the second of the two main modes of procedure, namely what I have designated above as the N-2 process. In this specific example of my invention, the coarsest material is removed from Mayari ore and the balance is ground slightly to yield a product of substantially −65 mesh. This ore thus sized is then subjected to a drying operation. This drying operation is primarily to get rid of excess moisture and no attempt is made to get rid of substantially all the water. In fact, when thus dried, the ore contains a substantial amount of water mostly in the combined form. In practice I prefer to keep the drying temperature at not over 300° F.

The ore, thus sized and moderately dried, is mixed with water and nitric acid in a tank to make a slurry. In this particular example, the amount of nitric acid used is .525 ton per ton of contained calcined ore treated and 1.225 tons of water per ton of contained calcined ore being treated. It may be well to explain just what is meant by the expression "per ton of contained calcined ore being treated." The ore actually treated is not a calcined ore which is ore which has been heated to get rid of all or essentially all water, but is ore which still contains a substantial quantity of water since it has been only moderately dried as indicated in the preceding paragraph. While calcined ore is not used, it is expedient in determining the relative amounts of ore, nitric acid and water, to express the ore in terms of the calcined ore. Before treating a batch of ore, samples of the moderately dried ore are calcined to remove water, both free and combined. In the present specific illustration of my invention 1.158 units of moderately dried ore gives 1.00 unit of calcined ore. From this it will be evident that 1.158 tons of moderately dried ore contains 1.00 ton of ore figured on the basis of the ore when calcined. It is on the basis of the ore figured in terms of being water free or calcined that the relative quantities of ore, nitric acid and water are determined.

When I say in the preceding paragraph that, in the specific example, 0.525 ton of nitric acid is used, I mean the actual content of nitric acid whether the acid is added as pure acid or in the dilute form. When I say in the preceding paragraph that 1.125 tons of water are used this means that the total water is meant including any added water, water in the acid used, total water content of the moderately dried ore, and water derived from autoclave steam.

The slurry of acid, water and ore is pumped into an autoclave which is heated with saturated steam at 400 p. s. i. gage, which is fed directly into the autoclave, to bring the slurry to a temperature of 400° F. The slurry is continuously agitated in the autoclave during treatment therein. In this specific example of my process, the autoclaving operation is continuous, i. e. the slurry is fed continuously into a lower part of the autoclave and withdrawn continuously from an upper part of the autoclave. The rate of flow of slurry into the autoclave and the rate of slurry therefrom are such that the average detention time of material in the autoclave is 60 minutes in this particular example.

Following the autoclaving treatment the solution is separated from the treated ore and the treated ore is thoroughly washed. Most of nickel and cobalt of the ore have gone into the solution and the major part of the iron remains in the ore. The nitrate solution containing the nickel and cobalt together with the other dissolved substances is concentrated and partially decomposed by passing through an evaporator. The concentrated and partially decomposed nitrates are then passed into a rotary kiln where they are completely decomposed forming a mixture of oxides, including the nickel and cobalt. In so doing considerable nitric acid and oxides of nitrogen are liberated which are recovered and utilized for treatment of more ore.

The treated ore containing most of the iron is low in nickel, the amount present in this case being 0.033% nickel. A sample of the material after being calcined at 1400° F. for two hours, will analyze substantially as follows:

| | Percent |
|---|---|
| Fe | 61.5 |
| Ni | .033 |
| Cr | 2.5 |
| Co | 0.01 |
| Mn | less than 0.10 |
| $SiO_2$ | 5.7 |
| $Al_2O_3$ | 2.3 |

As stated above, in this specific example the autoclaving treatment is "continuous." While I prefer the continuous method for manipulative and economic reasons my process is fully effective chemically when a batch method is employed. By the "batch" method I mean that method of procedure whereby the autoclave is charged with a material to be treated, autoclaved and then discharged, following which another batch may be charged and treated and so on. In general I find that the batch method requires a somewhat lesser time of stay in the autoclave than the average detention time required in the continuous method to give the same results.

While in the illustrative example given above the conditions of temperature of autoclave, amounts of nitric acid and water, and time of treatment in the autoclave have been set forth in specific terms, these conditions may be varied considerably and still enable one to obtain sufficiently low nickel contents in the product. In general, within certain wide limits, the higher the temperature of the autoclave operation, other conditions being the same, the more effective the separation of the various constituents of the ore. The higher the amount of nitric acid per ton of contained calcined ore, other conditions being equal, the more effective the lowering of the nickel, cobalt, manganese and aluminum content. The same is true as regards length of time of the autoclave operation, i. e. the greater the length of time the more effective the lowering of the nickel content. On the other hand, the greater the amount of water per ton of contained calcined ore the less effective is the lowering of the nickel content. Following I shall give illustrations of variations in these four conditions.

As examples of temperature variations, consider the following: Mayari ore slurry, containing 0.65 ton nitric acid and 1.517 tons of water of contained calcined ore when autoclaved at 340° F. for 236 minutes and then washed thoroughly contains 0.05% nickel. By increasing the temperature to 360° F., while maintaining the same conditions as to acid and water content, and the same time of treatment, as in the preceding example, the nickel content is lowered to 0.035%. Using a temperature of 400° F., with the other conditions the same as in the two preceding examples, the nickel content is lowered to 0.016%.

Another aspect of the matter of variation of temperature of autoclaving is very important from a practical standpoint and that is the fact that increase of temperature enables one to obtain the desired reduction of nickel content in lesser times of operation. Consider the first example given in the preceding paragraph. In that example one can obtain at 340° F. a product containing 0.05% nickel, a content of nickel which is sufficiently low to render the product available for all practical purposes in the manufacture of low nickel content for iron and steel, in 236 minutes. Now if the temperature of the autoclave operation is increased to 360° F., while using the same quantities of acid and water, one is able to get the nickel content down to 0.05% in 172 minutes as against 236 minutes when a temperature of 340° F. is used. When a temperature of 400° F. is used, a product containing 0.05% nickel can be obtained in 16 minutes. Considering the first and third examples given it will be seen that by increasing the temperature from 340° F. to 400° F. one has reduced the time of autoclave operation from 236 minutes to 16 minutes. Obviously, this is a tremendous advantage in output of a plant.

As examples of the effects of different amounts of nitric acid, consider the following examples. A slurry of Mayari ore containing 0.525 ton nitric acid and 1.40 tons water per ton of contained calcined ore heated in the autoclave to 400° F. for 72 minutes gives a product, when washed, containing 0.05% nickel. By increasing the nitric acid to 0.60 ton, while maintaining the other conditions (water content of slurry, temperature of autoclaving, and time of autoclaving) the same as in the preceding example, a product is obtained containing 0.039% nickel. A further increase of nitric acid content per ton of contained calcined ore to 0.65 ton, while maintaining the other conditions the same, gives a product containing 0.035% nickel.

It is of interest to note the effect of increase of the quantity of nitric acid in reducing the length of time required to get a product containing 0.05% nickel. In the first example given in the preceding paragraph, where 0.05% nickel is obtained by autoclaving with 0.525 ton of nitric acid the autoclaving continued for 72 minutes. If the nitric acid is increased to 0.60 ton, while retaining the same water content and temperature of operation, a product containing 0.05% nickel is obtained in 34 minutes, and if the nitric acid content is increased to 0.65 ton a product containing 0.05% nickel is produced in 20 minutes.

As indicated earlier, the longer the autoclave treatment continues (within rather wide limits), other conditions remaining the same, the more the nickel will be lowered in the ore. As an example, consider the following. A slurry of Mayari ore containing 0.65 ton nitric acid and 1.517 tons water per ton of contained calcined ore gives a product containing 0.05% nickel in 16 minutes when using a temperature of 400° F. Increasing the time to 236 minutes, the other conditions remaining the same, the nickel content of the product is reduced to 0.016%.

As indicated earlier in this specification, increasing the amount of water in the slurry, other conditions being equal, decreases the effectiveness of the operation. For example, when a slurry of Mayari ore containing 0.60 ton nitric acid and 1.40 tons water per ton contained calcined ore is autoclaved at 400° F. a nickel content of 0.05% is obtained in the treated product in 34 minutes of operation. If the water content is increased to 2.40 ton, the nitric acid content and temperature of autoclaving remaining the same, the time of autoclave treatment must be increased from 34 minutes to 110 minutes to obtain a nickel content of 0.05% in the treated ore.

All of the conditions of operation in the N-2 process may vary other rather wide ranges. The quantity of nitric acid used should be at least sufficient to meet the stoichiometric requirements of the nickel and other non-ferrous constituents of the ore which form soluble nitrates. In Mayari ore most of the nickel, cobalt, manganese and aluminum is soluble in nitric acid and therefore in determining the stoichiometric need for nitric acid I allow for an amount of nitric acid theoretically equivalent to all of these elements present in the ore. Portions of other non-ferrous constituents of Mayari ore are capable of being dissolved, such as portions of the magnesium and chromium and in providing for the stoichiometric requirements of the non-ferrous constituents of the ore I also allow for those portions of these other constituents which are soluble in nitric acid. In practice I usually prefer to employ somewhat in excess of these stoichiometric requirements. In practice I most frequently employ a quantity of nitric acid which ranges from 1.15 times to 2.50 times the amount necessary to satisfy the stoichiometric requirements of the non-ferrous constituents of the ore capable of being dissolved by nitric acid. Ordinarily the quantity of nitric acid used in treating Mayari ore will lie in the range of from 0.40 ton to 1.20 tons per ton of contained calcined ore. It is to be understood that the quantity of acid mentioned are quantities figured in terms of 100% nitric acid. In practice I usually employ aqueous solutions of nitric acid, the concentrations ranging from 10% to 70%, but the quantities of nitric acid to be used are estimated in terms of 100% nitric acid.

The quantity of water used in the N-2 process can vary considerably and still enable the obtaining of effective results. As indicated above, however, the larger the quantity of water present the more other factors such as temperature, quantity of acid, and length of time must be increased to compensate for the limiting effect of water in order to get the same results. In practice, therefore, I prefer to keep the quantity of water as low as possible, consistent with the practical needs of operation. In the continuous type of operation, such as has been indicated above, it is important from a practical standpoint to have the slurry of ore and acid in a pumpable state. It may therefore be said that for the continuous type of operation there should be sufficient water to render the slurry pumpable. In practice I prefer, however, that the quantity of water be not in excess of 1.8 tons per ton of contained calcined material.

As has been indicated, the concentrations of the solution of nitric acid used may vary widely. I have carried out my process successfully with from 10% to 70%. In ordinary practice I usually prefer to employ a concentration of from 22% to 70%. The concentration of the acid solution used is usually a factor in the length of time necessary for the autoclaving operation, the time of treatment, other conditions being the same, being less as the concentration is increased.

The temperature of autoclaving in the N-2 process may vary over a wide range. It should ordinarily be between 310° F. and 650° F. For practical operations I prefer a temperature between 330° F. and 550° F. and find that in actual work a temperature between 385° F. and 450° F. gives consistently good results.

The time of autoclaving in the N-2 process may also vary greatly. I have secured good results in from one-half minute to six hours. Where I have referred above to specific examples of times of the autoclaving operation it is to be understood that the times mentioned relate to the use of the continuous type of operation and the times indicated are average times of detention in the autoclave. When using the batch system of operation I have found in general the same results may be secured in somewhat lesser times of operation.

It is to be understood that the conditions of temperature, quantities of acid and water, are well interrelated. This is evident from the examples which I have given above. In practice one must select any particular condition of the broad ranges just given with consideration of the other conditions. For example, when one uses an autoclaving temperature near the bottom of the range one must compensate for the lesser effectiveness of the lower temperatures by using a higher quantity of the range of acid or a lesser amount of the range of water, or a longer time. Similarly, when one uses a short time of autoclaving it is necessary to use a higher temperature, or a higher quantity of acid or a lesser quantity of water.

In other words, when one considers the broad ranges of the conditions above given one must select from these ranges the particular temperature of autoclaving, quantities of water and acid and the time of operation such as to give the desired low nickel content, always considering the interrelation of the different conditions and their relative effects in producing the desired result.

In the specific example given above of the N-1 process the analysis of the iron product obtained shows a chromium content of 1.0% chromium and in the specific example of the N-2 process the analysis of the iron product shows a chromium content of 2.5%. In each case the chromium content is somewhat higher than is desired in iron bearing material for making many kinds of steel.

Both the N-1 and N-2 processes may advantageously be combined with treatment for removing chromium. Examples for producing iron products low in nickel, cobalt and chromium follow.

Mayari ore is mixed with soda ash, using 80 parts of soda ash per 100 parts of contained calcined ore. This mixture is roasted at a temperature of from 1700° F. to 1900° F. for one hour. The roasted product is then treated with water to remove the soluble parts thereof. The roasting of the Mayari ore and the subsequent extraction of soluble matter by means of water reduces the content of the chromium to a very low figure; in this specific example the chromium content is reduced to less than 0.10%. This treatment also removes most of the alumina.

The treated product, low in alumina and chromium but still containing practically all of the nickel and cobalt of the original ore is now subjected to either the N-1 or N-2 process to obtain an iron containing product in which the nickel and cobalt is reduced to the desired degree. In practice it will be found that in both the N-1 and N-2 processes less acid may be used than when ores are treated which have not been subjected to the chromium removing treatment. This is because of the fact that the removal of most of the alumina gives a product having considerably less material which can react with nitric acid to form soluble nitrates. For example, when employing the N-2 process on Mayari ore which has not been subjected to the chromium removing treatment I usually find it necessary to employ at least 0.40 ton of nitric acid per ton of contained calcined ore, but when I use the N-2 process on Mayari ore which has been subjected to the chromium removing treatment the amount of nitric acid necessary may be considerably less. However, even when using the N-2 process on Mayari ore which has been treated to remove chromium I usually find it advisable not to use less than 0.14 ton of nitric acid per ton of contained calcined ore. In the specific example of treatment to remove chromium, given above, the reagent employed in the roasting step is soda ash, ($Na_2CO_3$). Other substances are equivalents for the purpose of removing chromium. Any alkali may be used such as the carbonate, bicarbonate, hydroxide of sodium or potassium or mixtures or combinations of these compounds.

The amount of alkali to use should be at least such that the reagent is stoichiometrically equivalent to the aluminum and chromium contained in the ore. In practice I prefer to use in excess of this amount. In the specific example given above the amount employed is considerably in excess of the stoichiometric requirements of the aluminum and chromium.

I have found that the use of the roast with alkali followed by the subsequent removal of soluble matter by means of water not only greatly reduces the content of chromium but it also changes the nature of the ore in such a way that it is more readily acted upon by nitric acid in both the N-1 and N-2 processes.

This application is a continuation-in-part of my copending application Serial No. 47,760, now abandoned, filed September 3, 1948 for Processes for Treating Nickel Bearing Iron Ores.

I claim:

1. In a process of treating Mayari type ore, the steps of mixing a 10% to 70% by weight aqueous solution of nitric acid with the ore, the quantity of contained nitric acid being at least sufficient to meet the stoichiometric requirements of the nickel, cobalt, manganese and aluminum of the ore being treated but insufficient to meet such requirements and also nitrate a major portion of the iron of the ore, heating the mixture of solution and ore to a temperature of between 310° F. and 650° F. in an autoclave to produce a vapor pressure within the autoclave sufficient to retain water and nitric acid in the liquid phase, maintaining the mixture at such temperature for a sufficient time to dissolve most of the nickel and cobalt of the ore but retain most of the iron in the solid phase low in nickel content, and separating the solution containing nickel and cobalt from the treated ore.

2. A process for treating Mayari type ore to lower the nickel content in the ore, comprising the steps of mixing ore with an aqueous solution of nitric acid having a concentration of from 10% to 70% by weight, the quantity of contained nitric acid being at least sufficient to meet the stoichiometric requirements of the nickel, cobalt, manganese, and aluminum of the ore being treated but insufficient to meet such requirements and also nitrate a major portion of the iron of the ore, and the quantity of contained water being not over 1.8 tons per ton of contained calcined ore, heating the mixture of nitric acid solution and ore to a temperature of from 310° F. to 650° F. in an autoclave to produce a vapor pressure within the autoclave sufficient to retain water and nitric acid in the liquid phase, maintaining the mixture at such temperature for a sufficient time to dissolve most of the nickel and cobalt from the ore while retaining most of the iron in the solid phase in the ore having a low nickel content and separating the solution containing the dissolved nickel and cobalt from the treated ore.

3. A process for treating Mayari type ore to produce an iron bearing product low in nickel, comprising the steps of mixing the ore and an aqueous solution of nitric acid of from 10% to 70% concentration by weight, the quantity of contained nitric acid ranging from 0.40 ton to 1.20 tons per ton of contained calcined ore, heating the mixture of ore and nitric acid solution to a temperature of from 385° F. to 450° F. in an autoclave to produce a vapor pressure within the autoclave sufficient to retain water and nitric acid in the liquid phase, maintaining the mixture at such temperature for a sufficient time to dissolve most of the nickel of the ore while retaining most of the iron in the solid phase in the ore low in nickel content, and separating the solution containing nickel from the treated ore.

4. A process of treating Mayari type ore to produce an iron bearing product low in nickel, comprising the steps of mixing the ore with an aqueous solution of nitric acid of from 22% to 70% concentration by weight, the quantity of contained nitric acid ranging from 1.15 times to 2.50 times the amount necessary to satisfy the stoichiometric requirements of the non-ferrous constituents of the ore capable of being dissolved by nitric acid, heating the mixture to a temperature of from 330° F. to 550° F. in an autoclave to produce a vapor pressure within the autoclave sufficient to retain water and nitric acid in the liquid phase, maintaining the mixture at such temperature for a sufficient time to dissolve most of the nickel of the ore while retaining most of the iron in the solid phase in the ore low in nickel content, the time being less with the higher temperatures, higher concentrations of acid and amounts of acid, and the times being greater with the lower temperatures, lesser concentrations of nitric acid and lesser quantities of nitric acid.

5. A process of treating oxidic material containing iron and nickel, comprising the steps of mixing the material with a 10% to 70% by weight aqueous solution of nitric acid, the quantity of nitric acid being at least sufficient to satisfy the stoichiometric requirements of the nickel and also the stoichiometric requirements of the other non-ferrous constituents of the material capable of being dissolved by nitric acid, but insufficient to meet such requirements and also to nitrate a major portion of the iron in the material, heating such mixture in an autoclave to a temperature of from 310° F. to 650° F. to produce a vapor pressure in the autoclave sufficient to retain water and nitric acid in the liquid phase, maintaining the mixture at such temperature for a sufficient time to obtain a solid phase containing most of the iron of the ore as iron oxide low in nickel content and a solution containing the major portion of the nickel of the material.

6. A process for treating Mayari type iron ore to remove nickel, cobalt, and chromium from the ore, comprising the steps of roasting the ore with alkali under oxidizing conditions, dissolving the soluble constituents of the roasted ore with water, removing the solution from the treated ore, heating the ore thus treated with a 10% to 70% by weight aqueous solution of nitric acid the amount of contained nitric acid being at least sufficient to meet the stoichiometric requirements of the nickel, cobalt, manganese and aluminum of the treated ore, but insufficient to meet such requirements and also nitrate a major portion of the iron of the treated ore, heating the mixture in an autoclave to a temperature of from 310° F. to 650° F. to produce a vapor pressure in the autoclave sufficient to retain water and nitric acid in the liquid phase, maintaining the mixture at such temperature for a sufficient time to dissolve most of the nickel and cobalt from the ore while retaining most of the iron in the solid phase within the ore low in nickel content, and separating the solution containing nickel and cobalt from the treated ore.

References Cited in the file of this patent

UNITED STATES PATENTS

| | | |
|---|---|---|
| 603,797 | Storer | May 10, 1898 |
| 981,451 | McKechnie et al. | Jan. 10, 1911 |
| 1,570,777 | Pike | Jan. 26, 1926 |
| 2,219,633 | Pande | Oct. 29, 1940 |
| 2,344,004 | Six | Mar. 14, 1944 |
| 2,643,204 | Mancke | June 23, 1953 |

FOREIGN PATENTS

| | | |
|---|---|---|
| 188,865 | Great Britain | Nov. 23, 1922 |
| 386,288 | Great Britain | 1933 |

OTHER REFERENCES

Report of Investigations 3626, March 1942. "Manganese Investigations. . . ." Published by Bureau of Mines, Washington, D. C. Entire report is relied upon and has 30 pages and 7 figures. Pages 5, 6, 7, 10, 11, 15, 24 and 26 pertinent.